United States Patent
Ma et al.

(10) Patent No.: US 9,250,467 B2
(45) Date of Patent: Feb. 2, 2016

(54) MANUFACTURING MOLD AND MANUFACTURING METHOD FOR COLOR FILTER

(75) Inventors: Xiao-long Ma, Shenzhen (CN); Chun-liang Lee, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 552 days.

(21) Appl. No.: 13/375,484

(22) PCT Filed: Oct. 26, 2011

(86) PCT No.: PCT/CN2011/081301
§ 371 (c)(1),
(2), (4) Date: Nov. 30, 2011

(87) PCT Pub. No.: WO2013/059995
PCT Pub. Date: May 2, 2013

(65) Prior Publication Data
US 2013/0101748 A1    Apr. 25, 2013

(30) Foreign Application Priority Data
Oct. 25, 2011    (CN) .......................... 2011 1 0327213

(51) Int. Cl.
B29C 45/14    (2006.01)
G02F 1/1335    (2006.01)
G02B 5/20    (2006.01)
B29C 45/34    (2006.01)
B29L 11/00    (2006.01)

(52) U.S. Cl.
CPC .... *G02F 1/133516* (2013.01); *B29C 45/14336* (2013.01); *B29C 45/14778* (2013.01); *B29C 45/34* (2013.01); *G02B 5/20* (2013.01); *B29K 2995/0018* (2013.01); *B29L 2011/0066* (2013.01)

(58) Field of Classification Search
None
See application file for complete search history.

(56) References Cited

U.S. PATENT DOCUMENTS

| | | | | | |
|---|---|---|---|---|---|
| 4,695,420 | A | * | 9/1987 | Grawey et al. | 264/265 |
| 5,609,889 | A | * | 3/1997 | Weber | 425/116 |
| 5,776,512 | A | * | 7/1998 | Weber | 425/116 |
| 6,989,177 | B2 | * | 1/2006 | Lin | 427/510 |
| 7,008,584 | B2 | * | 3/2006 | Inoue et al. | 264/154 |
| 7,138,081 | B2 | * | 11/2006 | Inoue et al. | 264/254 |
| 7,491,355 | B2 | * | 2/2009 | Inoue et al. | 264/154 |
| 7,799,263 | B2 | * | 9/2010 | Song | 264/496 |
| 8,012,385 | B2 | * | 9/2011 | Kim | 264/1.7 |
| 8,313,681 | B2 | * | 11/2012 | Watanabe | 264/273 |

(Continued)

FOREIGN PATENT DOCUMENTS

| | | | |
|---|---|---|---|
| JP | 03229203 | * | 10/1991 |
| JP | 06281926 | * | 10/1994 |
| WO | WO 2009/142082 | * | 11/2009 |

*Primary Examiner* — Edmund Lee

(57) ABSTRACT

The present invention provides a manufacturing mold for a color filter including: a mold boy provided with an injection hole for overcoat material and having a recess for forming a pad at a side facing color photoresist. The present invention further relates to a manufacturing method for a color filter. The manufacturing method and the corresponding manufacturing mold of the present invention can realize an integral formation of the color filter, so as to solve the technical problems of redundant working processes, troublesome control and low manufacturing efficiency in existing manufacturing method for the color filter.

8 Claims, 5 Drawing Sheets

(56) References Cited

U.S. PATENT DOCUMENTS 8,852,481 B2 * 10/2014 Hougron .................. 264/272.21

2007/0029277 A1 * 2/2007 Jacobowitz et al. ............ 216/24
2010/0255267 A1 * 10/2010 Chang ........................... 428/187

* cited by examiner

MANUFACTURING MOLD AND MANUFACTURING METHOD FOR COLOR FILTER

TECHNICAL FIELD OF THE INVENTION

The present invention relates to a field of liquid crystal display (LCD) manufacture, and more particularly, to a manufacturing method for forming a color filter at a time and a manufacturing mold corresponding thereto.

BACKGROUND OF THE INVENTION

An LCD comprises a color filter, an upper array substrate and a lower array substrate, the upper and lower array substrates have transparent electrodes disposed thereon, and a layer of liquid crystal molecules is provided between the upper and lower array substrates. The LCD applies an electric field through the transparent electrodes to control the orientations of the liquid crystal molecules so as to change a deflection state of incident light, and a deflection plate is used for permitting the light path to penetrate or blocking the light path, thereby realize accomplishment of a goal of display.

FIG. 1 is a schematic diagram of a structure of an existing color filter, as shown in the drawing, a color filter 120 is provided on an upper array substrate 110 at a side close to the liquid crystals, R, G, B pixels are formed by coating, developing, etching color photoresist 121 for achieving a goal of color display. In addition, a black photoresist 122 is coated at locations of gaps of the color photoresist 121, as a BM (black matrix) for the purpose of avoiding light leakage and color blending among the respective pixels. A layer of overcoat material is coated on a surface of the color photoresist 121 and the black photoresist 122 for reducing segment differences of the color filter so as to further planarize the color filter. Furthermore, some incline regions 125 are formed when the color photoresist 121 is formed, the orientations of the liquid crystal molecules will be disordered, thereby light leakage occurs. The light leakage resulted from the orientation disorder of the liquid crystal molecules can be efficiently reduced after an overcoat layer 123 is formed. After the overcoat layer 123 if formed, pads 124 are produced by utilizing conventional exposing, developing, etching processes so as to maintain a cell space between an upper array substrate 110 and a lower array substrate. Accordingly, a predetermined thickness of a liquid layer can be achieved after liquid crystals are injected, thereby reach expected optical effects. As described, the manufacture of the overcoat layer 123 and the manufacture of the pads 124 require two working processes.

FIGS. 2A-2D are diagrams showing an existing flow for manufacturing a color filter. In this embodiment, the color filter is manufactured on a substrate 210 including a block photoresist 221 and a color photoresist 222. After overcoat material 230 is coated on a surface of the color filter, a corresponding manufacturing mold 240 is placed on the coated overcoat material 230, the manufacturing mold 240 includes a mold body 241 and recesses 242, each of which has a height and a shape corresponding to a pad 250. Based on the capillary principle, the recesses 242 will be gradually filled with the overcoat material 230. After the filling is completed, an overcoat layer 260 and the overcoat material 230 corresponding to the recesses 242 are cured by a heat curing or UV curing manner. After the manufacturing mold 240 is removed, the overcoat layer 260 and the pads 250 are formed.

However, there are defects as follows in manufacturing the color filter by the above method:

1. Two working processes including coating the overcoat layer 260 and forming the pads 250 are also required, the only difference is that a photo mask required for forming the pads 250 is replaced by the manufacturing mold 240;

2. It is difficult to control the thickness of the overcoat layer 260 and the height of the pad 250, and a film thickness variation will occur after the overcoat material 230 in the vicinity of the pad 250 is adsorbed due to the capillary phenomenon of the recess 242 in the manufacturing mold 240, thereby degrade the evenness of the overcoat layer 260;

3. The adsorbing rate the capillary phenomenon of is slow, the manufacturing efficiency is low.

Therefore, there is a need for providing a manufacturing method for a color filter and a corresponding manufacturing mold to solve the problems existing in the prior arts.

SUMMARY OF THE INVENTION

An objective of the present invention is to provide a manufacturing method and a corresponding manufacturing mold for integrally forming a color filter, so as to solve technical problems of redundant working processes, troublesome control and low manufacturing efficiency in existing manufacturing method for the color filter.

In order to solve the above problems, technical solutions provided by the present invention are as follows:

The present invention relates to a manufacturing mold for a color filter, wherein it comprises: a mold body, which is provided with an injection hole for overcoat material and has a recess for forming a pad at a side facing color photoresist; a supporter provided at an edge of the mold body for controlling a space between the mold body and the color photoresist; a height of the supporter determining a thickness of an overcoat layer; a receiving space being formed between the supporter and the mold body, and the supporter being provided with a first through hole for communicating the receiving space with external; the manufacturing mold for the color filter being further provided with a second through hole for communicating the recess with the external; a size and a shape of the pad being determined according to a size and a shape of the recess.

The present invention relates to a manufacturing mold for a color filter, wherein it comprises: a mold body, which is provided with an injection hole for overcoat material and has a recess for forming a pad at a side facing color photoresist.

In the manufacturing mold for the color filter of the present invention, the manufacturing mold for the color filter further comprises: a supporter provided at an edge of the mold body for controlling a space between the mold body and the color photoresist.

In the manufacturing mold for the color filter of the present invention, a height of the supporter determines a thickness of an overcoat layer.

In the manufacturing mold for the color filter of the present invention, a receiving space is formed between the supporter and the mold body, and the supporter is provided with a first through hole for communicating the receiving space with external.

In the manufacturing mold for the color filter of the present invention, the manufacturing mold for the color filter is further provided with a second through hole for communicating the recess with external.

In the manufacturing mold for the color filter of the present invention, a size and a shape of the pad is determined according to a size and a shape of the recess.

The present invention further relates to a manufacturing method for a color filter, wherein it comprises steps of: A.

placing the manufacturing mold for the color filter on color photoresist; B. injecting overcoat material via an injection hole of the manufacturing mold of the color filter; C. curing the overcoat material to form an overcoat layer and a pad after injection of the overcoat material is finished.

In the manufacturing method for the color filter of the present invention, a height of the supporter determines a thickness of an overcoat layer.

In the manufacturing method for the color filter of the present invention, a size and a shape of the pad is determined according to a size and a shape of the recess.

In the manufacturing method for the color filter of the present invention, the step C comprises curing the overcoat material by heat curing or UV curing to form the overcoat layer and the pad after the injection of the overcoat material is finished.

The manufacturing method for the color filter and the corresponding mold of the present invention have the following advantageous effects: the integral formation of the color filter can be realized, technical problems of redundant working processes, troublesome control and low manufacturing efficiency in existing manufacturing method for the color filter are avoided.

For better understanding to the above contents of the present invention, preferred embodiments are described in detail for example in conjunction with the appending drawings as follows:

DETAILED DESCRIPTION OF THE INVENTION

Figure 1:
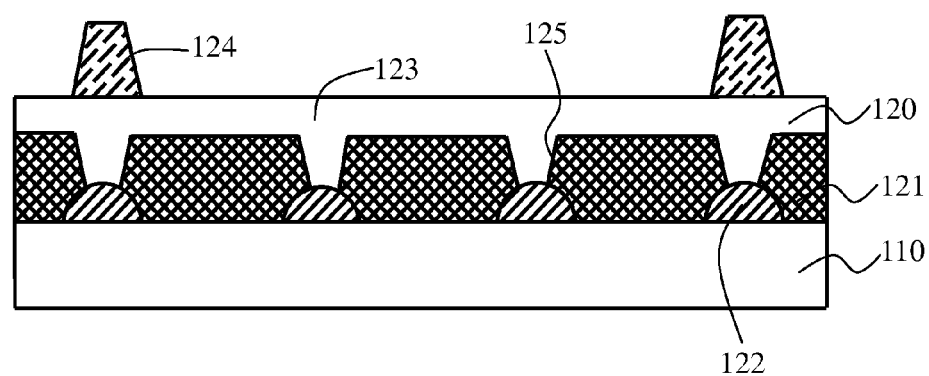
FIG. 1 is a schematic diagram of a structure of an existing color filter.
Figure 2A:
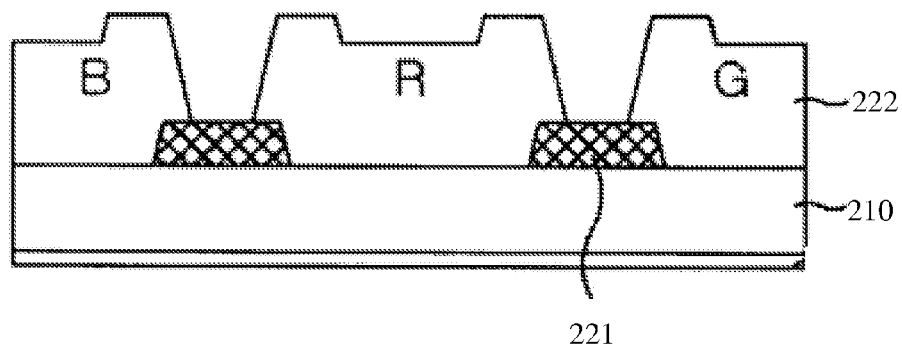
FIGS. 2A to 2D are diagrams showing an existing flow for manufacturing a color filter.
Figure 2B:
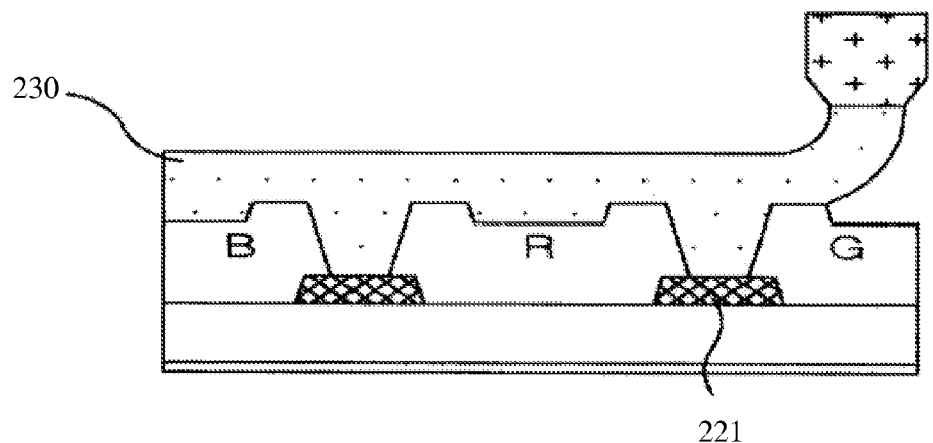
Figure 2C:
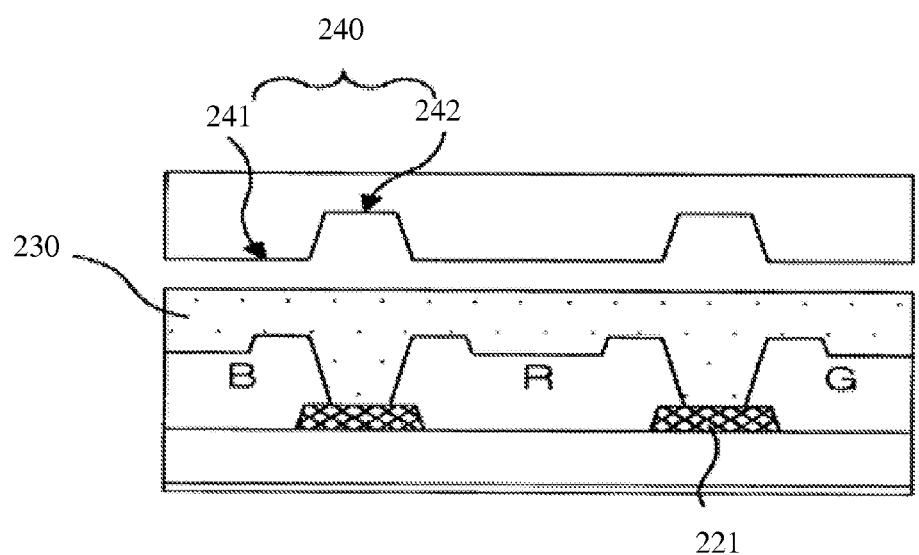
Figure 2D:
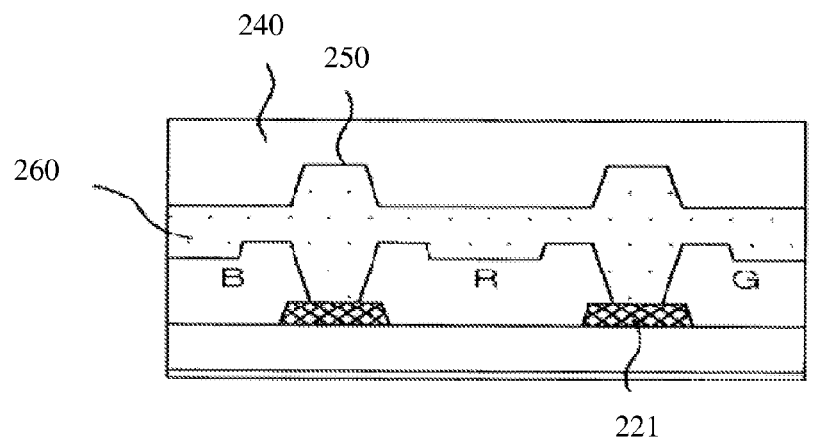

The following respective embodiment are specific embodiments described with reference to appending drawings for exemplifying that the invention is able to be implemented. In the drawings, units with similar structures are indicated by the same reference numbers.

Figure 3:
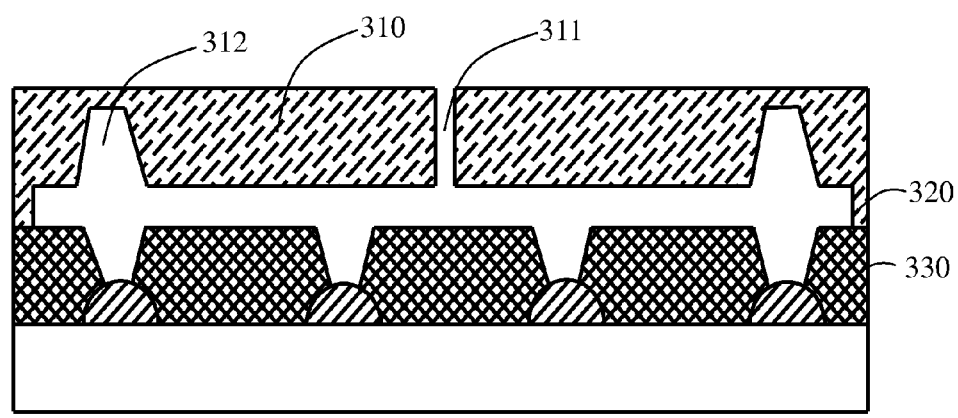
FIG. 3 is a schematic diagram showing a manufacturing mold for a color filter of a first preferred embodiment in use.

FIG. 3 is a schematic diagram showing a manufacturing mold for a color filter of a first preferred embodiment in use, in which a manufacturing mold for a color filter is involved, the mold comprises a mold body 310 and supporters 320, the mold body 310 is provided with an injection hole 311 for overcoat material, and recesses 312 for forming pads are provided at a side of the mold body 310 facing color photoresist. The supporters 320 are provided at edges of the mold body 310 for controlling a space between the mold body 310 and the color photoresist 330.

In addition to the recesses 312 for forming the pads, the manufacturing mold for the color filter in accordance with the present invention is further provided with the injection hole 311 for the overcoat material and the supporters 321 for controlling the space between the mold body 310 and the color photoresist 330. When using the manufacturing mold for the color filter to manufacture the color filter, the manufacturing mold for the color filter is placed on the color photoresist 330, and then the overcoat material is injected between the manufacturing mold and the color photoresist 330 via the injection hole 311 to form an overcoat layer, and at the same time to form the pads by the recesses 312 of the manufacturing mold, the injected overcoat material is cured at last, and an integrated manufacture of the overcoat layer and the pads is accomplished. In manufacturing the color filter by the manufacturing mold for the color filter of the present invention, a thickness of the overcoat layer is determined by a height of the supporter 320 of the manufacturing mold (i.e. the thickness of the overcoat layer approximately equals to the height of the supporter 320 in general), a size and a shape of the pad are determined by a size and a shape of the recess 312 of the manufacturing mold. Accordingly, the manufacture of the overcoat layer and the pads can be controlled more easily, and the speed of injection molding is faster as compared to the absorption of capillary, so that the processing time for the color filter is significantly reduced.

Figure 4:
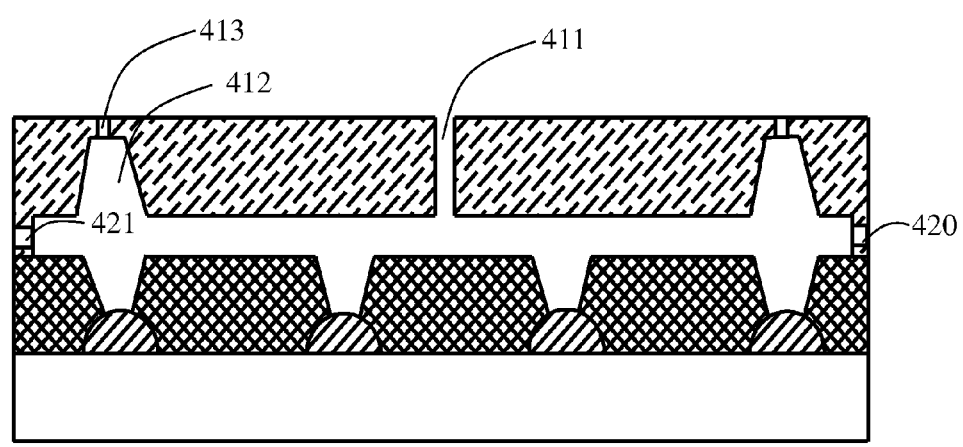
FIG. 4 is a schematic diagram showing a manufacturing mold for a color filter of a second preferred embodiment in use.

In FIG. 4, which is a schematic diagram showing a manufacturing mold for a color filter of a second preferred embodiment in use, based on the first preferred embodiment, a receiving space is formed by supporters 420 and a mold body, the supporter 420 of the manufacturing mold for the color filter has a first through hole 420 communicating the receiving space with external. In addition, the manufacturing mold for the color filter is provided with second through holes 413 for communicating recesses 412 with external.

The first through hole 421 is provided in the supporter 420, and therefore air in the receiving space can be exhausted via the first through hole 421 in time when the overcoat material is injected, as a result, the overcoat layer can be made more even without forming bubbles in the overcoat layer.

If the manufacturing mold for the color filter does not have the second through holes 413, when the overcoat material is injected to the injection hole 411, the overcoat material fails to completely fill up the recesses 412 due to an air pressure since the recesses of the manufacturing mold are basically in a closed form. At this time, the depth of the recess 412 is greater than the height of the pad. The size and shape of the pad are determined by the size and the shape of a lower portion of the recess 412. For example, if a receiving space defined by the recess 412 is cylindrical, then the formed pad will be a cylinder with a height less than the depth of the recess 412. When the manufacturing mold for the color filter is provided with the second through holes 413, the overcoat material injected from the injection hole 411 can completely fill up the recesses 412. Therefore, it is possible to accurately control the shape, size and height of the pad by the shape, size and depth of the recess 412, so that the manufacture of the pads is more precise.

Figure 5:
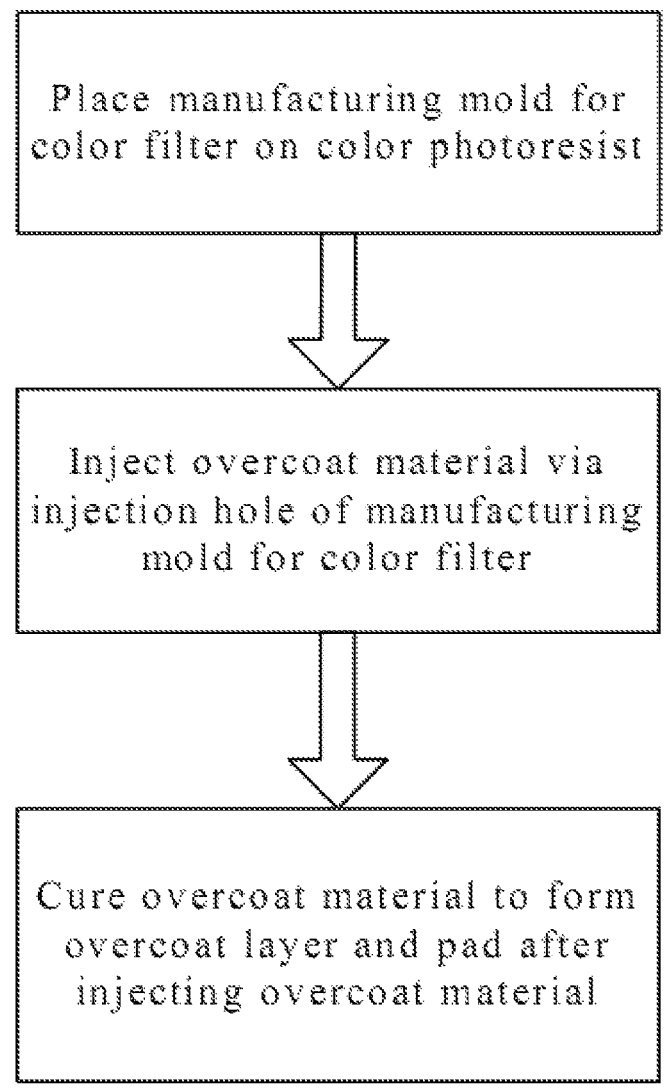
FIG. 5 is a flowchart of a manufacturing method for a color filter in accordance with the present invention.

The present invention also involves a manufacturing method for the color filter, in FIG. 5, which is a flowchart of a manufacturing method for a color filter in accordance with the present invention, the manufacturing method for the color filter comprises steps of: A. placing the manufacturing mold for the color filter on color photoresist; B. injecting overcoat material via an injection hole of the manufacturing mold for the color filter; C. curing the overcoat material after injection of the overcoat material is finished to form an overcoat layer and pads.

In the manufacturing method for the color filter in accordance with the present invention, the overcoat layer and the pads are formed integrally by using the injection hole and the supporters of the manufacturing mold for the color filter, and the thickness of the overcoat layer is determined by the supporter of the manufacturing mold for the color filter (the thickness of the overcoat layer approximately equals to the height of the supporter), and the shape and size of the pad is determined by the shape of size of the recess of the manufacturing mold for the color filter (e.g. when a receiving space defined by the recess is cylindrical, the formed pad is a cylinder with a height less than the depth of the recess or a cylinder with a height equivalent to the depth of the recess). As a result, the manufacture of the overcoat layer and the pads is more easily controllable, in addition, the speed of injection molding is faster than the capillarity absorption, so that the processing time for the color filter is significantly reduced.

As a preferred embodiment of the manufacturing method for the color filter of the present invention, the mentioned-above step C comprises: curing the formed overcoat material by heat curing or UV curing to from the overcoat layer and the pads. Various methods such as heat curing or UV curing can be utilized in the manufacturing method for the color filter of the present invention to cure the overcoat layer and the pads, which are formed integrally, of the color filter. A user may utilize a proper curing method to cure the overcoat layer and the pads according to the actual manufacture condition and requirements.

In conclusion, the present invention has been disclosed with the above preferred embodiments, however, the preferred embodiments are not provided for limiting the present invention, various modifications and alterations can be made by ordinary persons skilled in this art without departing from the principles of the present invention, and therefore a scope defined by the claims serves as the norm to the protection range of the present invention.

What is claimed is:

1. A manufacturing mold for a color filter, characterized in that, comprising:
   a mold body provided with an injection hole for overcoat material and having a recess for forming a pad at a side facing color photoresist;
   a supporter provided at an edge of the mold body for controlling a space between the mold body and the color photoresist;
   a height of the supporter determining a thickness of an overcoat layer;
   a receiving space being formed between the supporter and the mold body, and the supporter being provided with a first through hole for exhausting air from the receiving space;
   the manufacturing mold for the color filter being further provided with a second through hole for exhausting air from the recess;
   a size and a shape of the pad being determined according to a size and a shape of the recess.

2. A manufacturing mold for a color filter, characterized in that, comprising:
   a mold body provided with an injection hole for overcoat material and having a recess for forming a pad at a side facing color photoresists;
   a supporter provided at an edge of the mold body for controlling a space between the mold body and the color photoresist;
   a receiving space being formed between the supporter and the mold body, and the supporter being provided with a first through hole for exhausting air from the receiving space;
   the manufacturing mold for the color filter further provided with a second through hole for exhausting air from the recess.

3. The manufacturing mold for the color filter according to claim 2, characterized in that a thickness of an overcoat layer is determined by a height of the supporter.

4. The manufacturing mold for the color filter according to claim 2, characterized in that a size and a shape of the pad is determined according to a size and a shape of the recess.

5. A manufacturing method for a color filter, characterized in that, comprising steps of:
   A. placing the manufacturing mold for the color filter of claim 2 on color photoresist;
   B. injecting overcoat material via an injection hole of the manufacturing mold for the color filter;
   C. curing the overcoat material to form an overcoat layer and a pad after injection of the overcoat material is finished.

6. The manufacturing method for the color filter according to claim 5, characterized in that a thickness of the overcoat layer is determined by a height of a supporter of the manufacturing mold for the color filter.

7. The manufacturing method for the color filter according to claim 5, characterized in that a size and a shape of the pad is determined according to a size and a shape of a recess of the manufacturing mold for the color filter.

8. The manufacturing method for the color filter according to claim 5, characterized in that the step C comprises curing the overcoat material by heat curing or UV curing to form the overcoat layer and the pad after the injection of the overcoat material is finished.

* * * * *